(12) United States Patent
Jin et al.

(10) Patent No.: US 12,590,622 B2
(45) Date of Patent: Mar. 31, 2026

(54) REDUCTION GEARBOX FOR SOLAR PHOTOVOLTAIC TRACKING

(71) Applicants: Hengfengtai Precision Machinery Co., Ltd., Wenzhou (CN); Zhejiang Hengfengtai Mixing Technology Co., Ltd, Wenzhou (CN)

(72) Inventors: Lianghua Jin, Wenzhou (CN); Xiaobin Liu, Wenzhou (CN); Yi Zheng, Wenzhou (CN); Suben Lin, Wenzhou (CN); Bo Wang, Wenzhou (CN); Yongliang Ding, Wenzhou (CN); Xiang Liu, Wenzhou (CN); Kangle Liao, Wenzhou (CN)

(73) Assignees: Hengfengtai Precision Machinery Co., Ltd., Wenzhou (CN); Zhejiang Hengfengtai Mixing Technology Co., Ltd, Wenzhou (CN)

( * ) Notice: Subject to any disclaimer, the term of this patent is extended or adjusted under 35 U.S.C. 154(b) by 0 days.

(21) Appl. No.: 19/010,254

(22) Filed: Jan. 6, 2025

(65) Prior Publication Data

US 2025/0347335 A1 Nov. 13, 2025

(30) Foreign Application Priority Data

May 13, 2024 (CN) .......................... 202410591029.5

(51) Int. Cl.
*F16H 19/08* (2006.01)
*F16H 35/00* (2006.01)
(Continued)

(52) U.S. Cl.
CPC ............. *F16H 19/08* (2013.01); *F16H 35/00* (2013.01); *F16H 57/031* (2013.01);
(Continued)

(58) Field of Classification Search
CPC ..... F16H 2035/006; F16H 2057/02073; F16H 35/00; F16H 19/08; F16H 1/16; H02S 20/32
See application file for complete search history.

(56) References Cited

U.S. PATENT DOCUMENTS

| | | | | |
|---|---|---|---|---|
| 6,058,794 A | * | 5/2000 | Hempel | .................. F16H 55/06 74/439 |
| 9,464,697 B2 | * | 10/2016 | Antchak | ................... F16H 7/12 |
| 10,563,748 B2 | * | 2/2020 | Morgan | ............... F16H 57/039 |

FOREIGN PATENT DOCUMENTS

| | | | | |
|---|---|---|---|---|
| CN | 218063249 U | | 12/2022 | |
| EP | 1557547 B1 | * | 1/2011 | ........... F02D 9/1065 |

OTHER PUBLICATIONS

EP1557547B1 Machine Translation (Year: 2011).*

* cited by examiner

*Primary Examiner* — Jake Cook
(74) *Attorney, Agent, or Firm* — Bayramoglu Law Offices LLC

(57) ABSTRACT

A reduction gearbox for solar photovoltaic tracking includes a housing, an end cover, a gear, and a worm. A first limiting stopper is disposed on the top of the housing. A first limiting protrusion and a second limiting protrusion are disposed on a side of a gear ring of the gear, and the first limiting stopper, the first limiting protrusion and the second limiting protrusion define a hard limiting structure. The sum of an included angle between outer end surfaces of the first and second limiting protrusions and a central angle of the first limiting stopper is less than or equal to 170°. The difference between a central angle of the gear ring of the gear and a central angle of the worm is greater than or equal to 180°.

6 Claims, 14 Drawing Sheets

(51) Int. Cl.

|  |  |
|---|---|
| *F16H 57/02* | (2012.01) |
| *F16H 57/031* | (2012.01) |
| *F16H 57/039* | (2012.01) |
| *H02S 20/32* | (2014.01) |

(52) U.S. Cl.
CPC ..... *F16H 57/039* (2013.01); *F16H 2035/006* (2013.01); *F16H 2057/02073* (2013.01); *H02S 20/32* (2014.12)

A-A

B–B

C–C

D-D

REDUCTION GEARBOX FOR SOLAR PHOTOVOLTAIC TRACKING

CROSS REFERENCE TO THE RELATED APPLICATIONS

This application is based upon and claims priority to Chinese Patent Application No. 202410591029.5, filed on May 13, 2024, the entire contents of which are incorporated herein by reference.

TECHNICAL FIELD

The present disclosure relates to the technical field of solar photovoltaic devices, and specifically, to a reduction gearbox for solar photovoltaic tracking.

BACKGROUND

In the solar photovoltaic industry, most tracking mounts are rotated under the driving of specialized vertical slewing drives. A photovoltaic panel is mounted on an output member of the slewing drive, and the slewing drive rotates to adjust an angle of the photovoltaic panel towards the sun to obtain better photoelectric conversion efficiency.

Currently, the slewing drive mainly includes a housing, a gear, a worm, and an end cover. The gear and the worm are mounted in a cavity of the housing. A single-limit stopper structure is used for hard limiting of the slewing drive. A limiting position is disposed at an axial position of a tooth portion of the gear. A limiting stopper and a gear limiting stopper on the housing are used for interference. The gear limiting stopper means that an integral gear ring is cut by half and end surfaces at two ends of the gear ring are used as limiting gears. In a normal use condition, a tracking angle of the slewing drive is +60°, and a hard limiting angle is about #65°. In this case, the photovoltaic panel cannot be rotated to be perpendicular to the ground. Therefore, an arrangement scope of the photovoltaic industry is limited. In a solar power generation device that requires long-term outdoor operation, a photovoltaic module may face challenges of various harsh environments and various extreme weather conditions over a service life of up to twenty five years. In many regions, severe convective weather leads to frequent hailstorms. If hailstones are excessively large or intense, a significant impact force of the hailstones damages the photovoltaic module, which poses a great safety hazard. Once damage occurs, performance of a photovoltaic power generation system is affected. If the slewing drive can rotate the photovoltaic panel to be perpendicular to the ground in time, the hailstones will not cause damage to a surface of the photovoltaic panel. Therefore, a position for hard limiting of the slewing drive needs to be changed, so that the hard limiting angle is about +95°, and the tracking angle of the slewing drive is increased to +90°.

SUMMARY

A technical problem to be resolved in this application is to provide a reduction gearbox for solar photovoltaic tracking to overcome defects of the foregoing related technology, where a hard limiting angle of the reduction gearbox for solar photovoltaic tracking is above ±95° and a tracking angle thereof reaches ±90° or more, so that a photovoltaic panel can be rotated to be perpendicular to the ground.

A technical solution used in the present disclosure to resolve the technical problem is a reduction gearbox for solar photovoltaic tracking, including a housing, an end cover, a gear, and a worm, where a limiting stopper is disposed on the top of the housing, and a hard limiting structure is disposed between the limiting stopper and the gear; a first limiting protrusion and a second limiting protrusion that are symmetrical are disposed on at least one side of a gear ring of the gear, and the limiting stopper constitutes the hard limiting structure together with the first limiting protrusion and the second limiting protrusion; a sum of an included angle between an outer end surface of the first limiting protrusion and an outer end surface of the second limiting protrusion and a central angle of the limiting stopper is less than or equal to 170°; and a difference between a central angle of the gear ring of the gear and a central angle of the worm is greater than or equal to 180°.

Compared with the related technology, the reduction gearbox for solar photovoltaic tracking of this application has the following advantages: The sum of the included angle between the outer end surface of the first limiting protrusion and the outer end surface of the second limiting protrusion and the central angle of the limiting stopper is less than or equal to 170°, that is, an angle at which the gear rotates from a hard limiting position of the first limiting protrusion and the limiting stopper to a hard limiting position of the second limiting protrusion and the limiting stopper is greater than or equal to 190°, so that a hard limiting angle is above ±95°. In addition, the difference between the central angle of the gear ring of the gear and the central angle of the worm is greater than or equal to 180°, that is, a tracking angle of a slewing drive reaches ±90°. In this case, a photovoltaic panel may be rotated to be perpendicular to the ground. When the photovoltaic panel is perpendicular to the ground, snow accumulated on a photovoltaic panel surface can be cleared to the utmost extent, thereby facilitating cleaning of the photovoltaic panel. In addition, in some agricultural photovoltaic projects, rotating the photovoltaic panel to be perpendicular to the ground can maximize use of land and facilitate operation of agricultural machinery.

Preferably, a first limiting protrusion and a second limiting protrusion that are symmetrical are also disposed on the other side of the gear ring of the gear, and another limiting stopper is disposed on the top of the housing; and the another limiting stopper constitutes another hard limiting structure together with the first limiting protrusion and the second limiting protrusion that are on the other side. Therefore, two hard limiting structures are formed, so that limiting failures can be effectively reduced, and a contact ratio of meshing portions of the worm and the gear can be effectively ensured without affecting driving strength of the worm and the gear.

In an improvement, an included angle between two end surfaces of the limiting stopper is 30° to 50°. In this way, the limiting stopper has enough strength to be used as support for hard limiting of a photovoltaic panel module.

In an improvement, an end portion of a second end that is of the gear ring and that is close to the second limiting protrusion is meshed with the worm when the outer end surface of the first limiting protrusion abuts against one end of the limiting stopper; and an end portion of a first end that is of the gear ring and that is close to the first limiting protrusion is meshed with the worm when the outer end surface of the second limiting protrusion abuts against the other end of the limiting stopper. During rotation and reverse rotation of the gear, the gear ring of the gear is always stably meshed with the worm, and there is no detachment between the gear ring of the gear and the worm.

Most preferably, an included angle between an end surface of the first end of the gear ring and the outer end surface of the first limiting protrusion is 65°; and an included angle between an end surface of the second end of the gear ring and the outer end surface of the second limiting protrusion is also 65°.

Reference numbers of the accompanying drawings: 1. Housing; 11. Hard limiting stopper; 2. Gear; 21. Gear ring; 22. First limiting protrusion; 23. Second limiting protrusion; 3. Worm; and 4. End cover.

DETAILED DESCRIPTION OF THE EMBODIMENTS

First, a person skilled in the art should understand that the implementations are merely used to explain the technical principles of the embodiments of this application, and are not intended to limit the protection scope of the embodiments of this application. A person skilled in the art may adjust the embodiments as required, so that the embodiments are adapted to a specific application scenario.

The following further describes the present disclosure in detail with reference to the accompanying drawings and specific embodiments.

Embodiment 1

Figure 1:
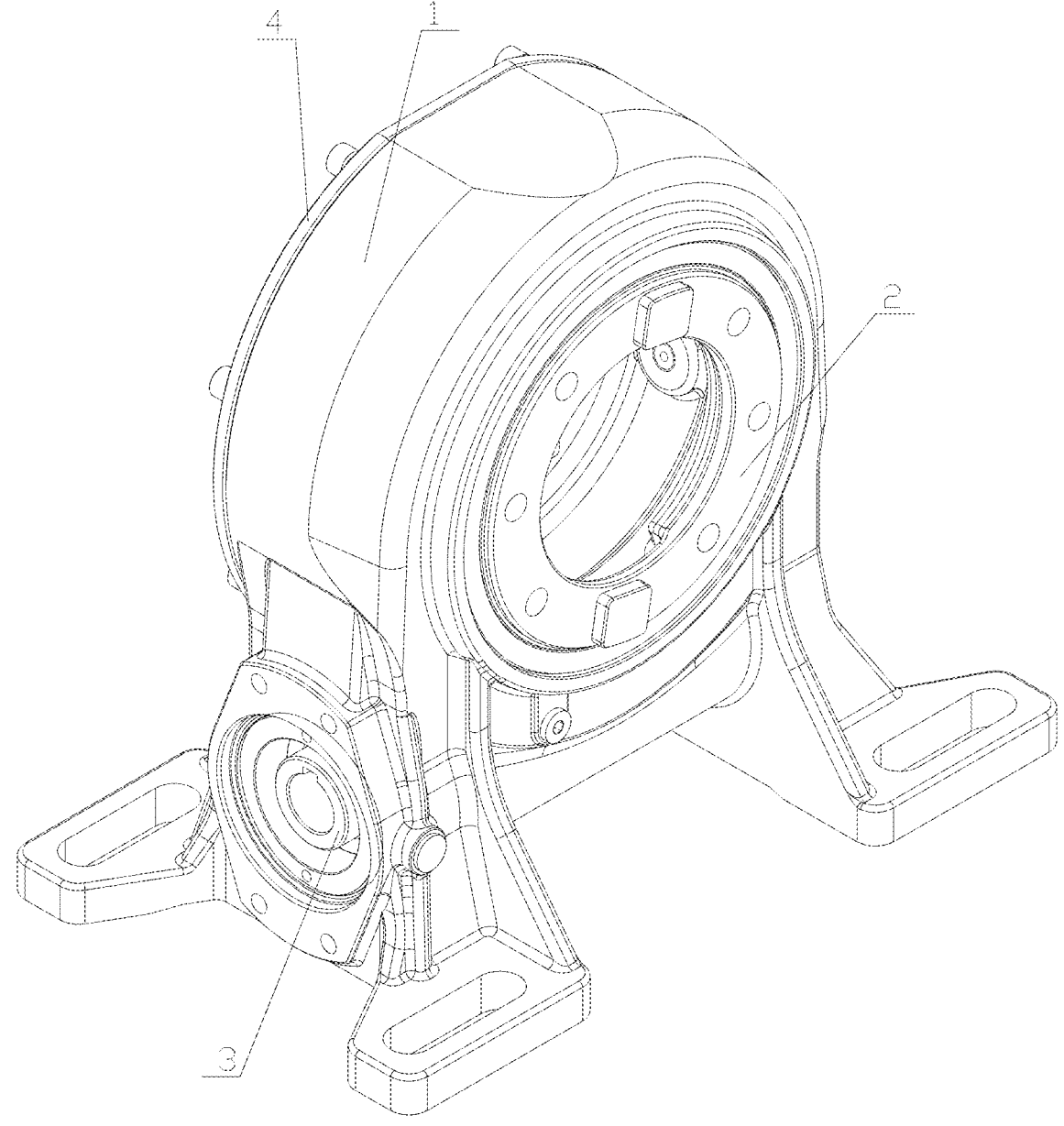
FIG. 1 is a three-dimensional schematic diagram of a reduction gearbox for solar photovoltaic tracking according to this application (not assembled with a photovoltaic panel)
Figure 2:
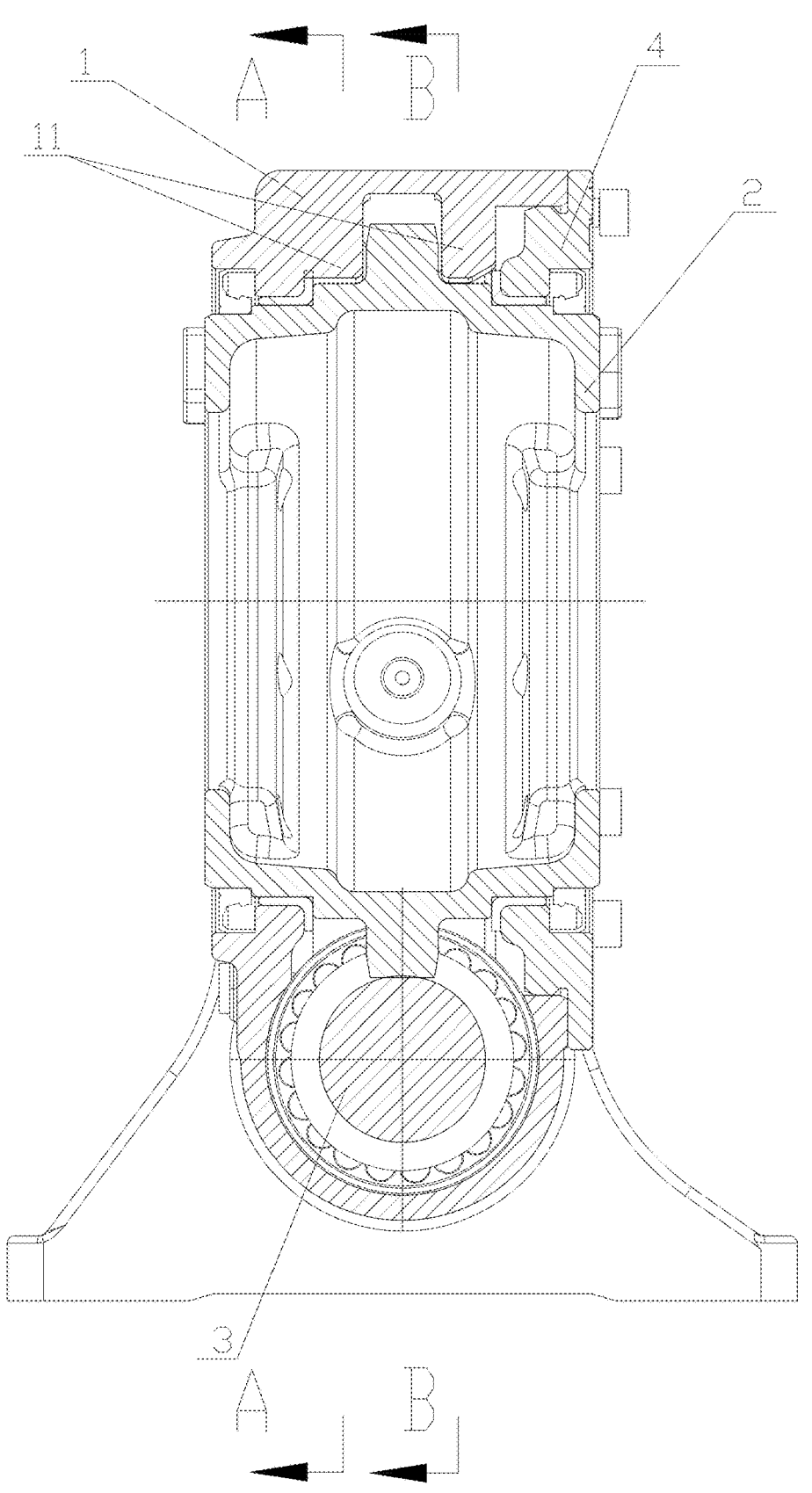
FIG. 2 is a schematic cross-sectional view of a hard limiting state of a reduction gearbox for solar photovoltaic tracking according to Embodiment 1 of this application.
Figure 3:
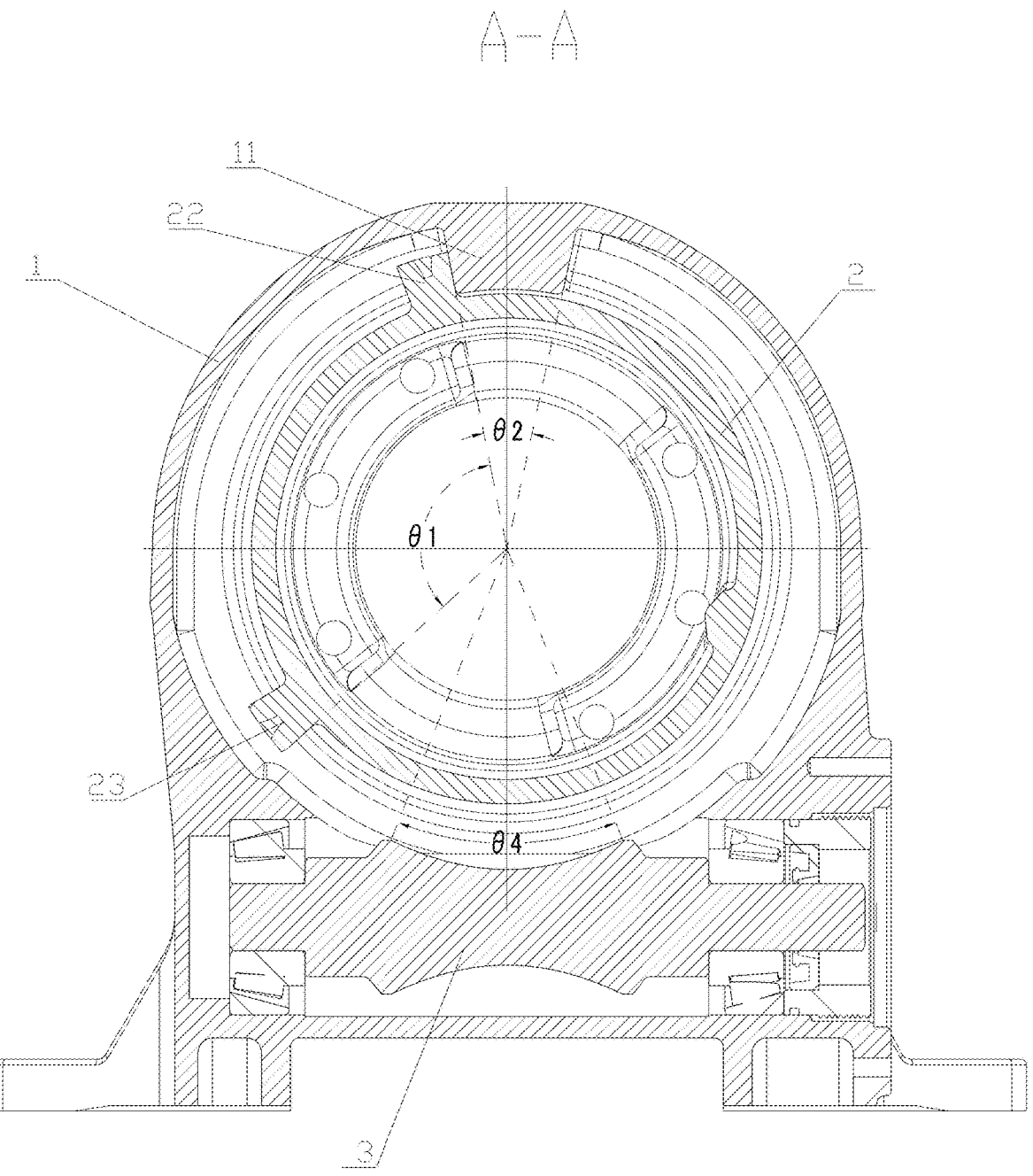
FIG. 3 is a schematic cross-sectional view along a line A-A in FIG. 2.
Figure 4:
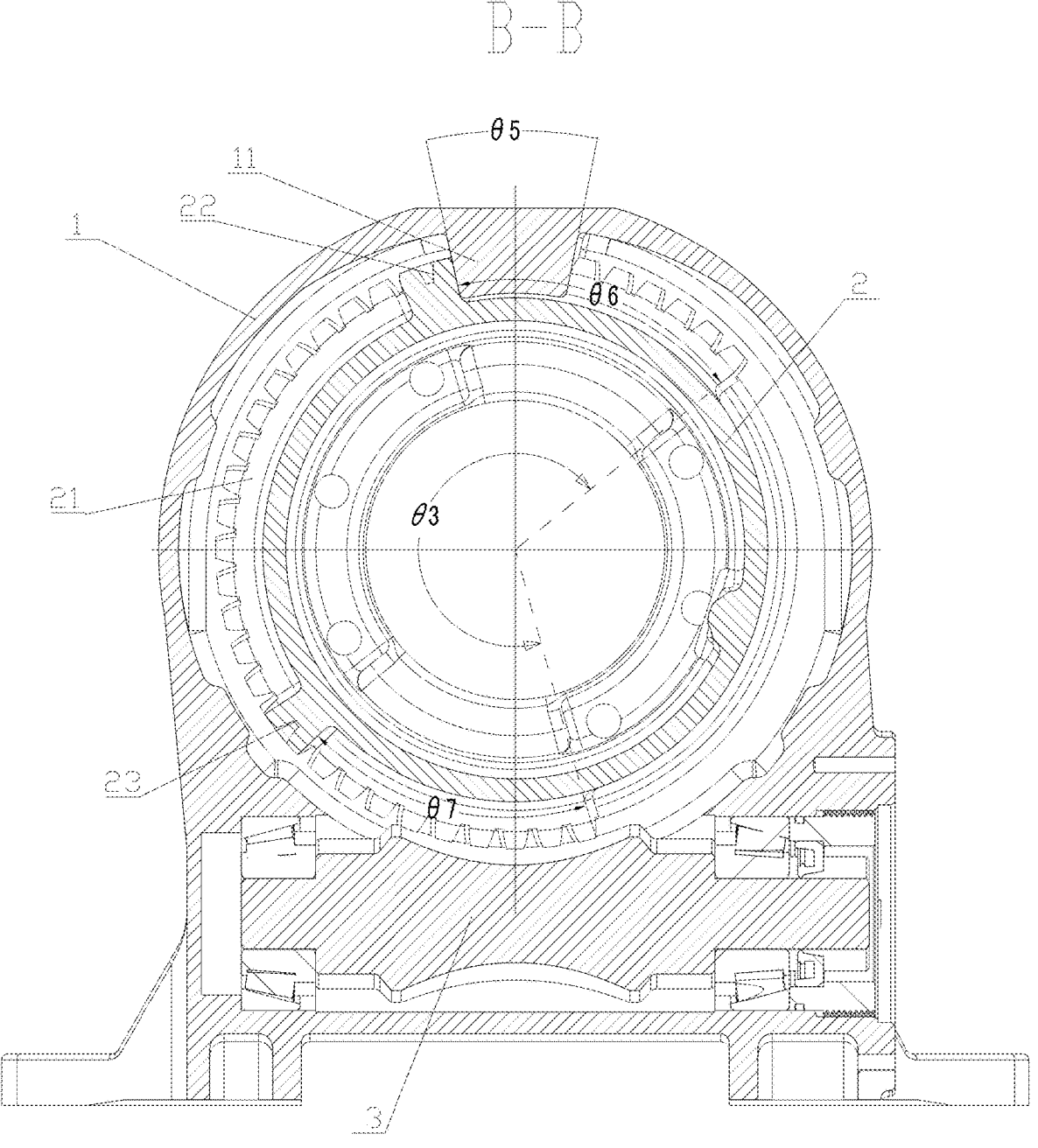
FIG. 4 is a schematic cross-sectional view along a line B-B in FIG. 2.
Figure 5:
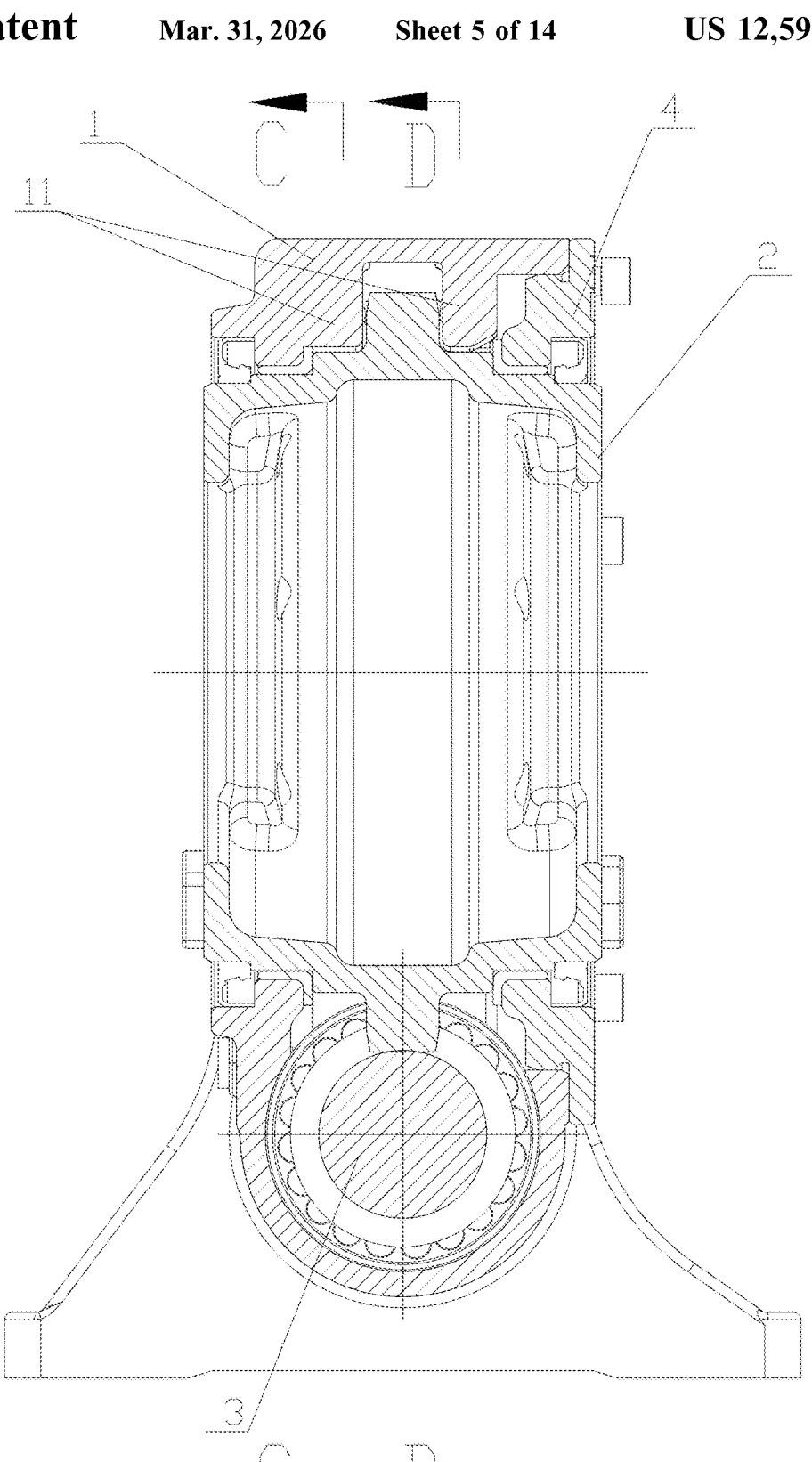
FIG. 5 is a schematic cross-sectional view of another hard limiting state of a reduction gearbox for solar photovoltaic tracking according to Embodiment 1 of this application.
Figure 6:
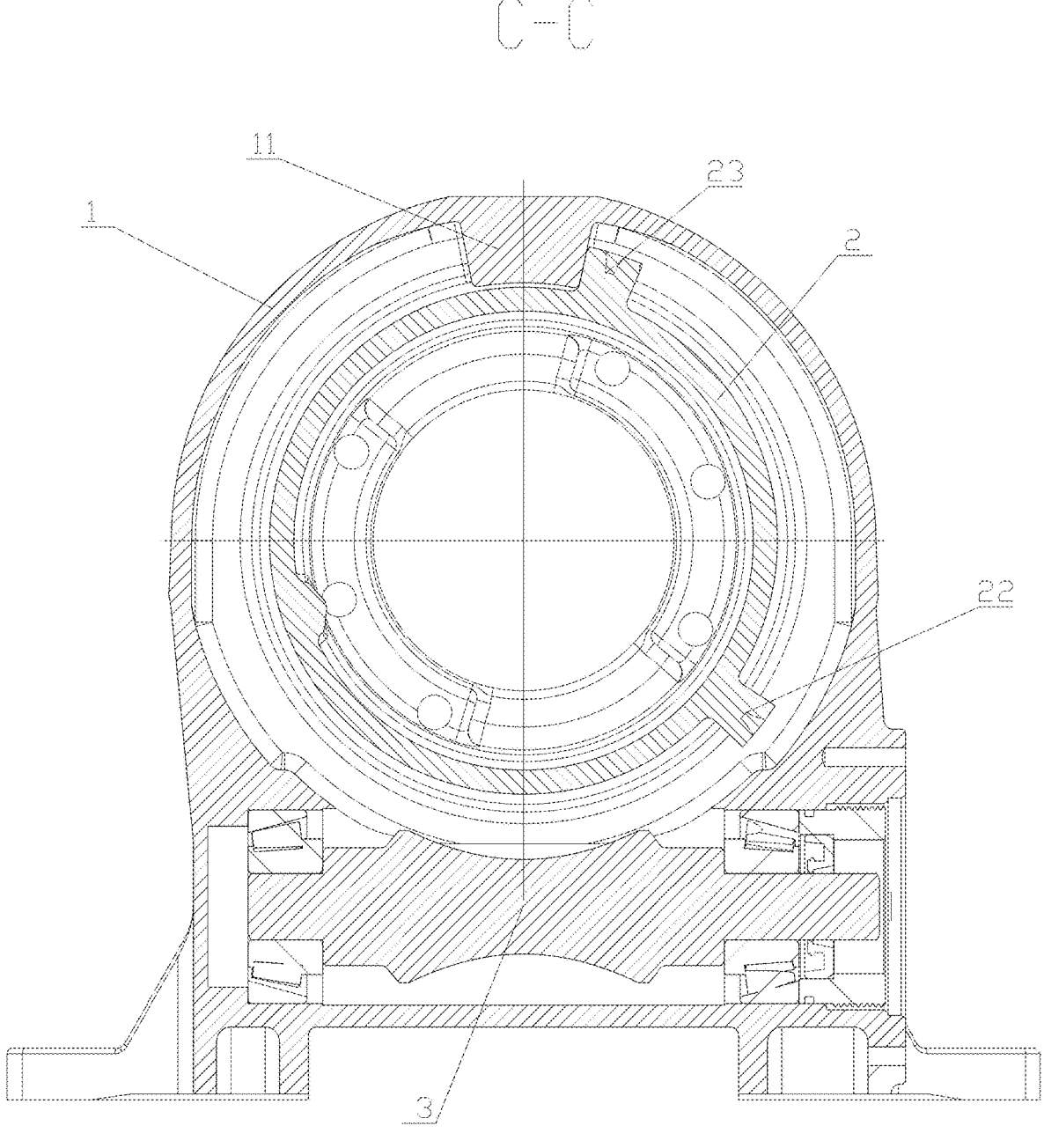
FIG. 6 is a schematic cross-sectional view along a line C-C in FIG. 5.
Figure 7:
FIG. 7 is a schematic cross-sectional view along a line D-D in FIG. 5.
Figure 8:
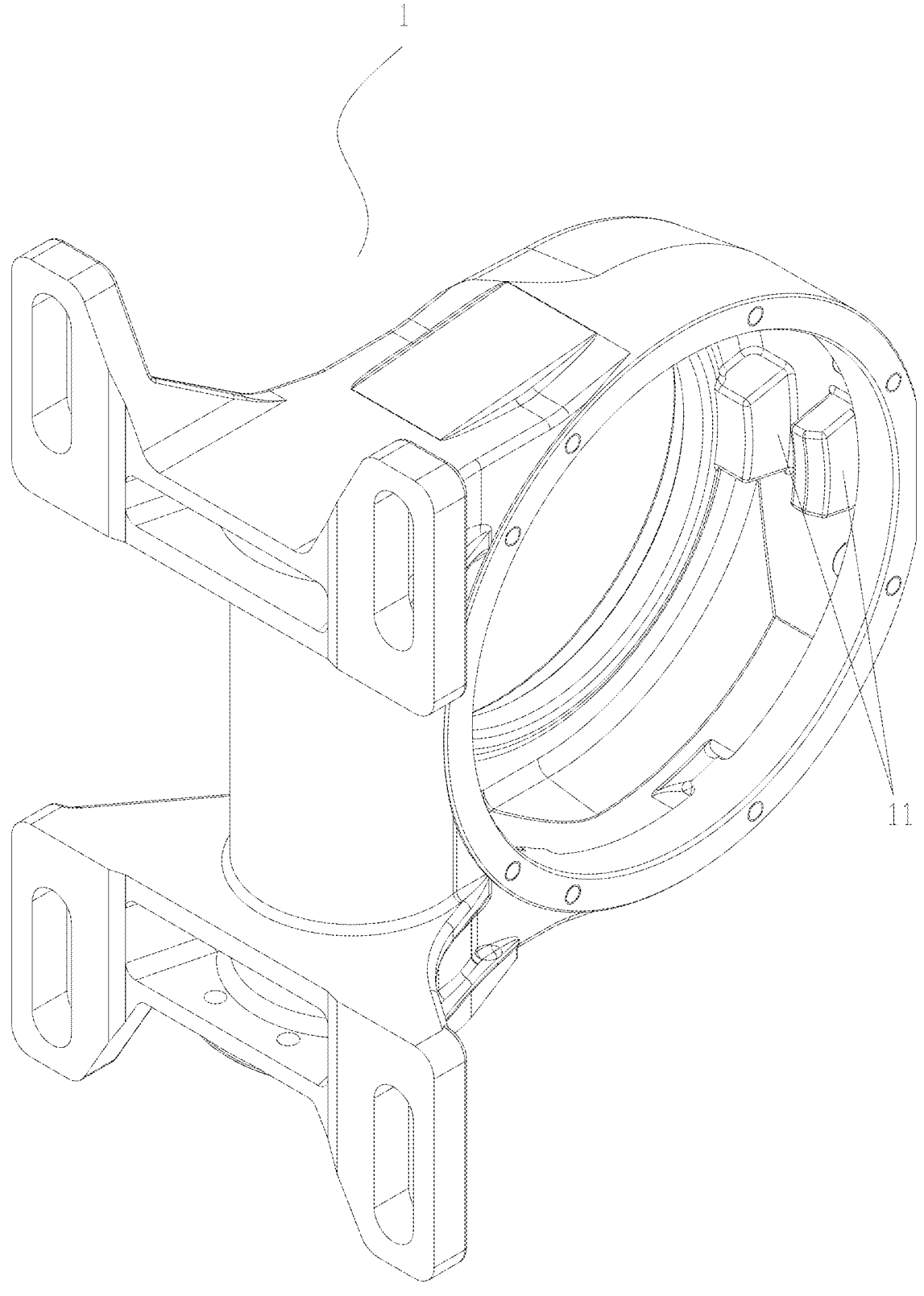
FIG. 8 is a three-dimensional schematic diagram of a housing of a reduction gearbox for solar photovoltaic tracking according to Embodiment 1 of this application.
Figure 9:
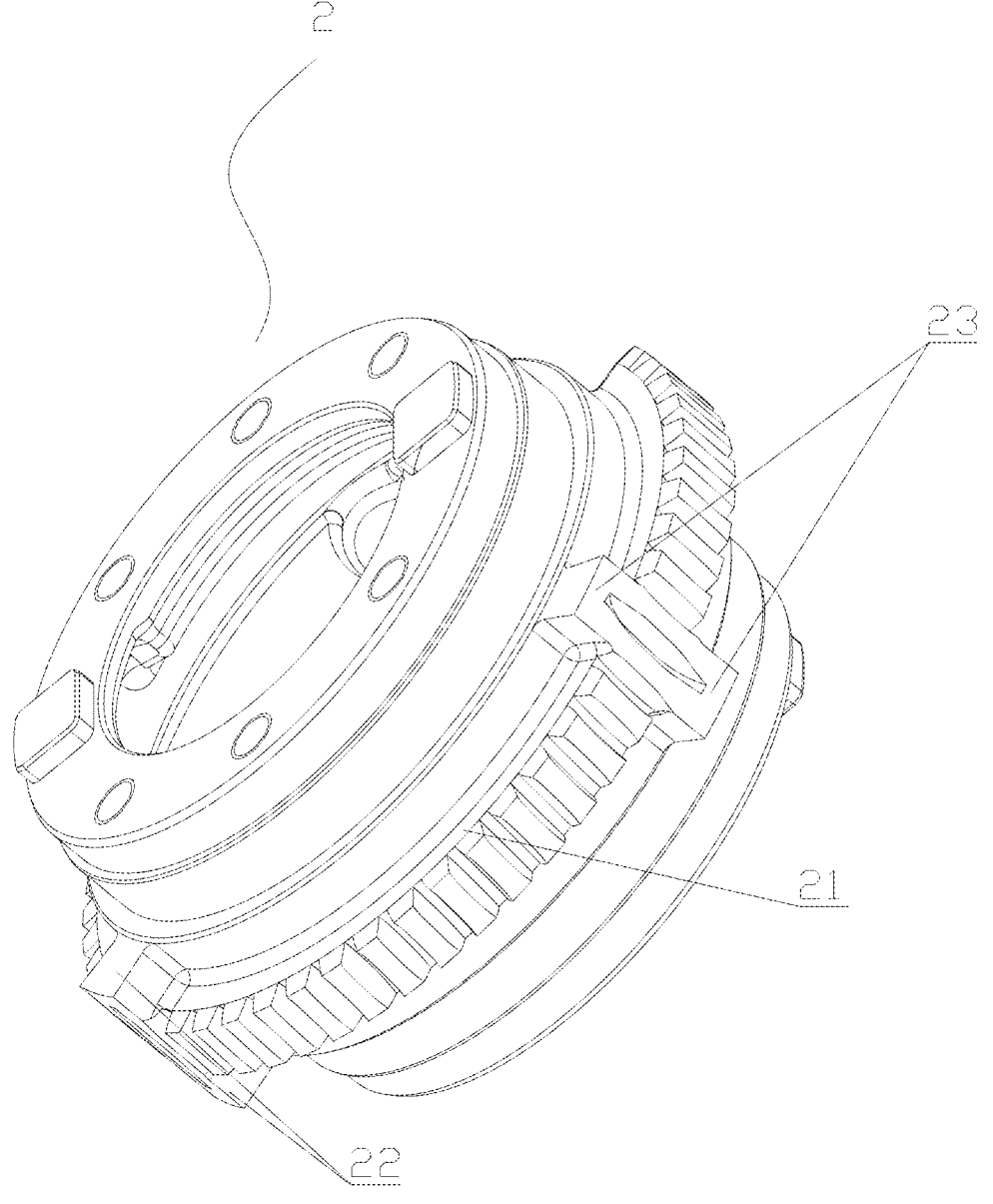
FIG. 9 is a three-dimensional schematic diagram of a gear of a reduction gearbox for solar photovoltaic tracking according to Embodiment 1 of this application.

In this preferred embodiment, FIG. 2 to FIG. 7 show a reduction gearbox for solar photovoltaic tracking, including a housing 1, a gear 2, a worm 3, and an end cover 4. A mounting cavity of the gear 2 and a mounting cavity of the worm 3 are disposed in the housing 1. A gear ring 21 of the gear 2 is meshed with the worm 3. The end cover 4 is fastened to the housing 1 by using a plurality of bolts to limit an axial motion range of the gear 2. The housing 1 is shown in FIG. 8, two spaced limiting stoppers 11 are disposed on the top of an inner wall of the housing 1, and a distance between the limiting stoppers 11 is slightly greater than a thickness of the gear ring 21. The gear 2 is shown in FIG. 9, and a first limiting protrusion 22 and a second limiting protrusion 23 that are symmetrical are disposed on one side that is of the gear ring 21 of the gear 2 and that is close to the end cover 4. The two limiting stoppers 11 and two pairs of first limiting protrusions 22 and second limiting protrusions 23 on two sides of the gear ring 21 constitute two hard limiting structures of the reduction gearbox. In addition, during normal rotation and reverse rotation of the gear 2, the gear ring 21 moves between the two limiting stoppers 11. A sum of an included angle between an outer end surface of the first limiting protrusion 22 and an outer end surface of the second limiting protrusion 23 and a central angle of the limiting stopper 11 is less than or equal to 170°. To be specific, as shown in FIG. 3 and FIG. 4, when the outer end surface of the first limiting protrusion 22 abuts against one end of the limiting stopper 11, an included angle between the outer end surface of the second limiting protrusion 23 and the other end of the limiting stopper 11 is greater than or equal to 190°; or as shown in FIG. 6 and FIG. 7, when the outer end surface of the second limiting protrusion 23 abuts against the other end of the limiting stopper 11, an included angle between the outer end surface of the first limiting protrusion 22 and one end of the limiting stopper 11 is greater than or equal to 190°. A difference between a central angle of the gear ring 21 of the gear 2 and a radian angle central angle of the worm 3 is greater than or equal to 180°. Herein, the central angle of the worm 3 is defined with an axis of the gear 2 as a center, and is an included angle between two ends of a worm tooth of the worm 3 relative to the axis of the gear 2. In this way, when the photovoltaic panel is in a horizontal state, an intermediate portion of the gear ring 21 of the gear 2 is meshed with the worm 3 (not shown). In this case, an included angle between an end surface of a first end that is of the gear ring 21 and that is close to the first limiting protrusion 22 and an end surface that is of the worm tooth of the worm 3 and to which the end surface of the first end is close is greater than or equal to 90°, and an included angle between an end surface of a second end that is of the gear ring 21 and that is close to the second limiting protrusion 23 and an end surface that is of the worm tooth of the worm 3 and to which the end surface of the second end is close is also greater than or equal to 90°. Therefore, the photovoltaic panel can rotate to be perpendicular to the ground in two hard limiting states.

The outer end surface of the first limiting protrusion 22 and the outer end surface of the second limiting protrusion 23 are end surfaces that are far away from each other, and correspondingly, an end surface of the first limiting protrusion 22 and an end surface of the second limiting protrusion 23 that are close to each other are referred to as inner end surfaces. In this embodiment, when the outer end surface of the first limiting protrusion 22 abuts against one end of the limiting stopper 11, an end portion of the second end that is of the gear ring 21 and that is close to the second limiting protrusion 23 is meshed with the worm 3. When the outer end surface of the second limiting protrusion 23 abuts against the other end of the limiting stopper 11, an end portion of the first end that is of the gear ring 21 and that is close to the first limiting protrusion 22 is meshed with the worm 3.

In this embodiment, an included angle between the end surface of the first end of the gear ring 21 and the outer end surface of the first limiting protrusion 22 is 65°; and an included angle between the end surface of the second end of the gear ring 21 and the outer end surface of the second limiting protrusion 23 is also 65°.

Embodiment 2

Figure 10:
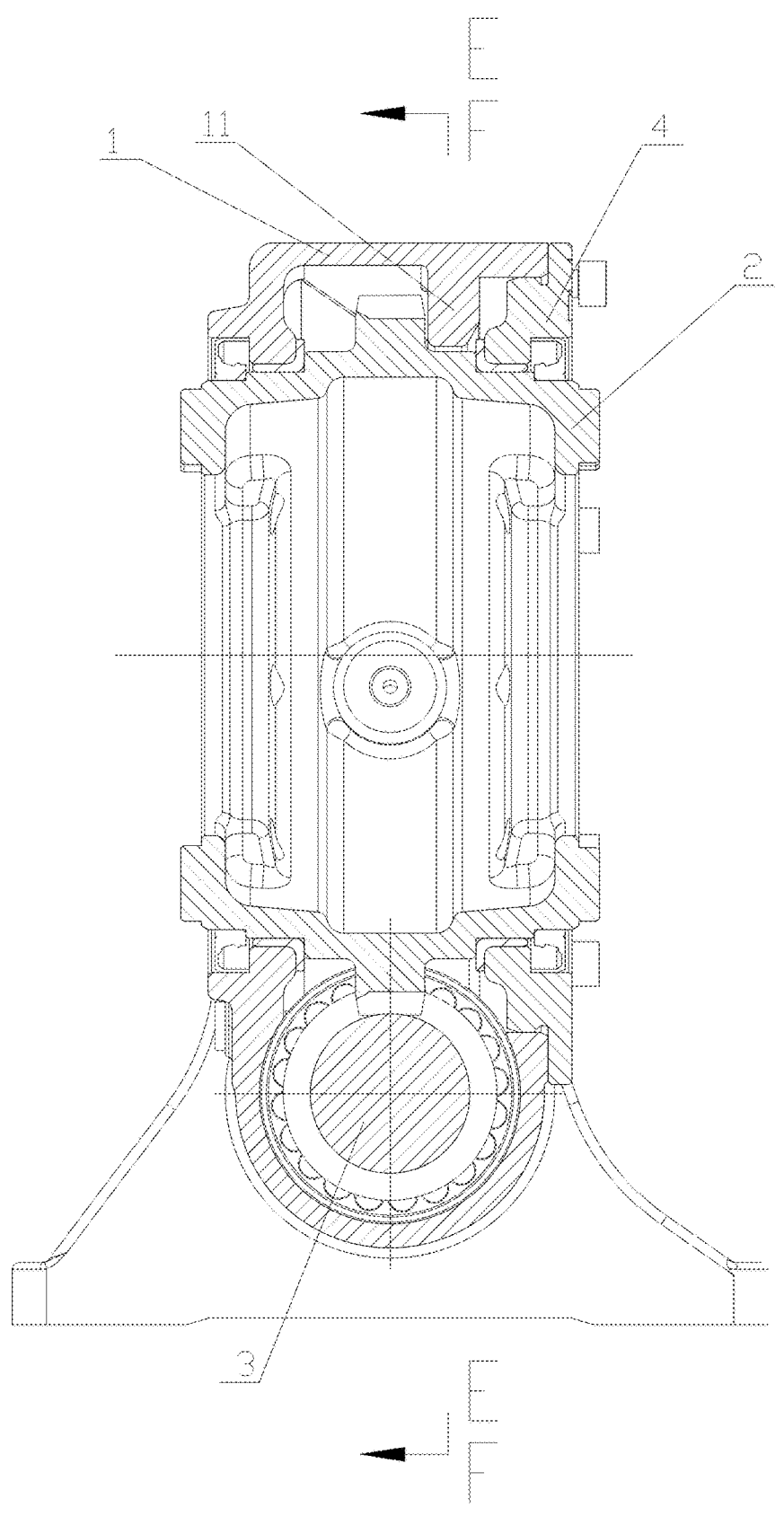
FIG. 10 is a schematic cross-sectional view of a reduction gearbox for solar photovoltaic tracking according to Embodiment 2 of this application.
Figure 11:
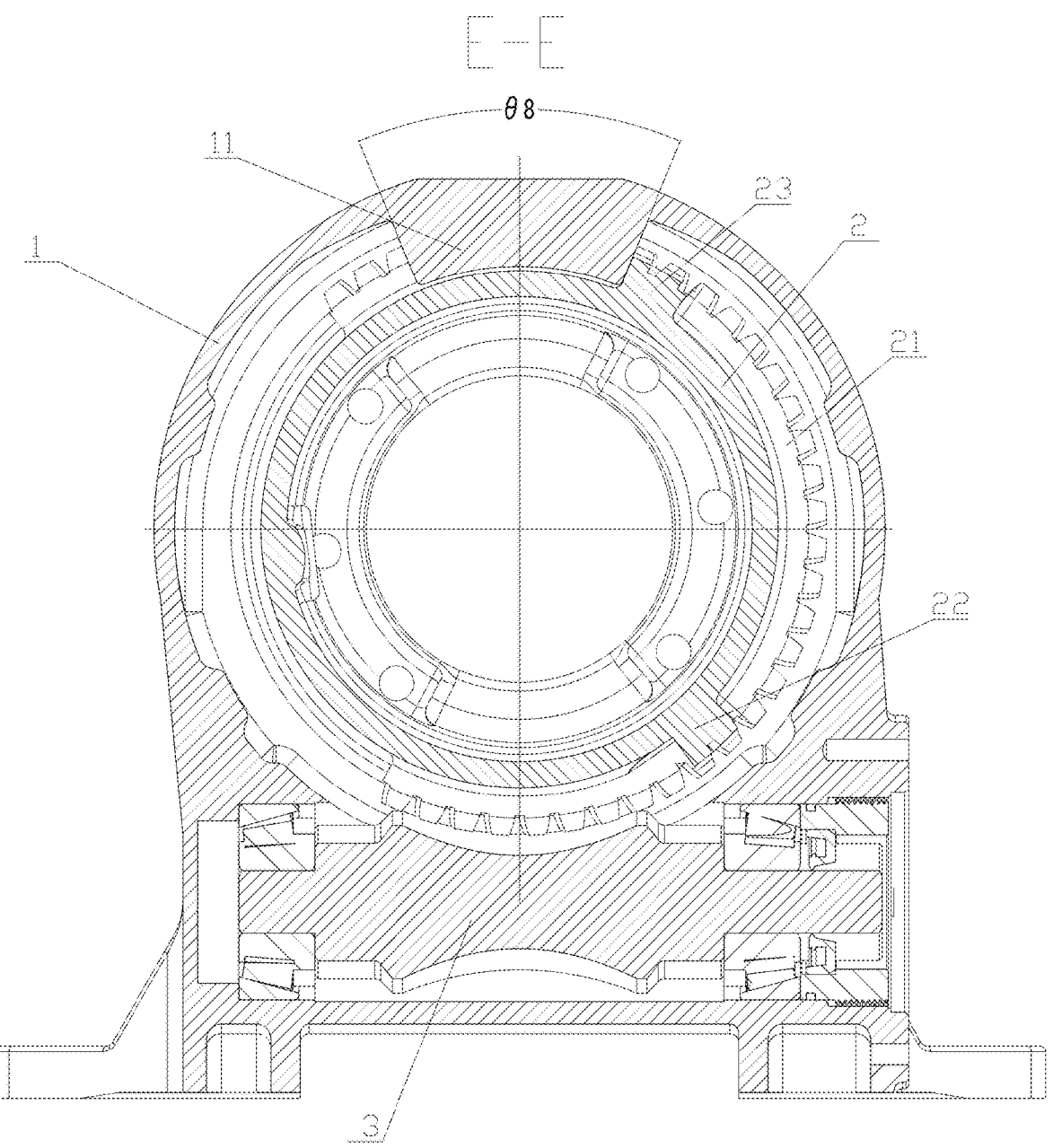
FIG. 11 is a schematic cross-sectional view of a hard limiting state of a reduction gearbox for solar photovoltaic tracking along a line E-E according to Embodiment 2 of this application.
Figure 12:
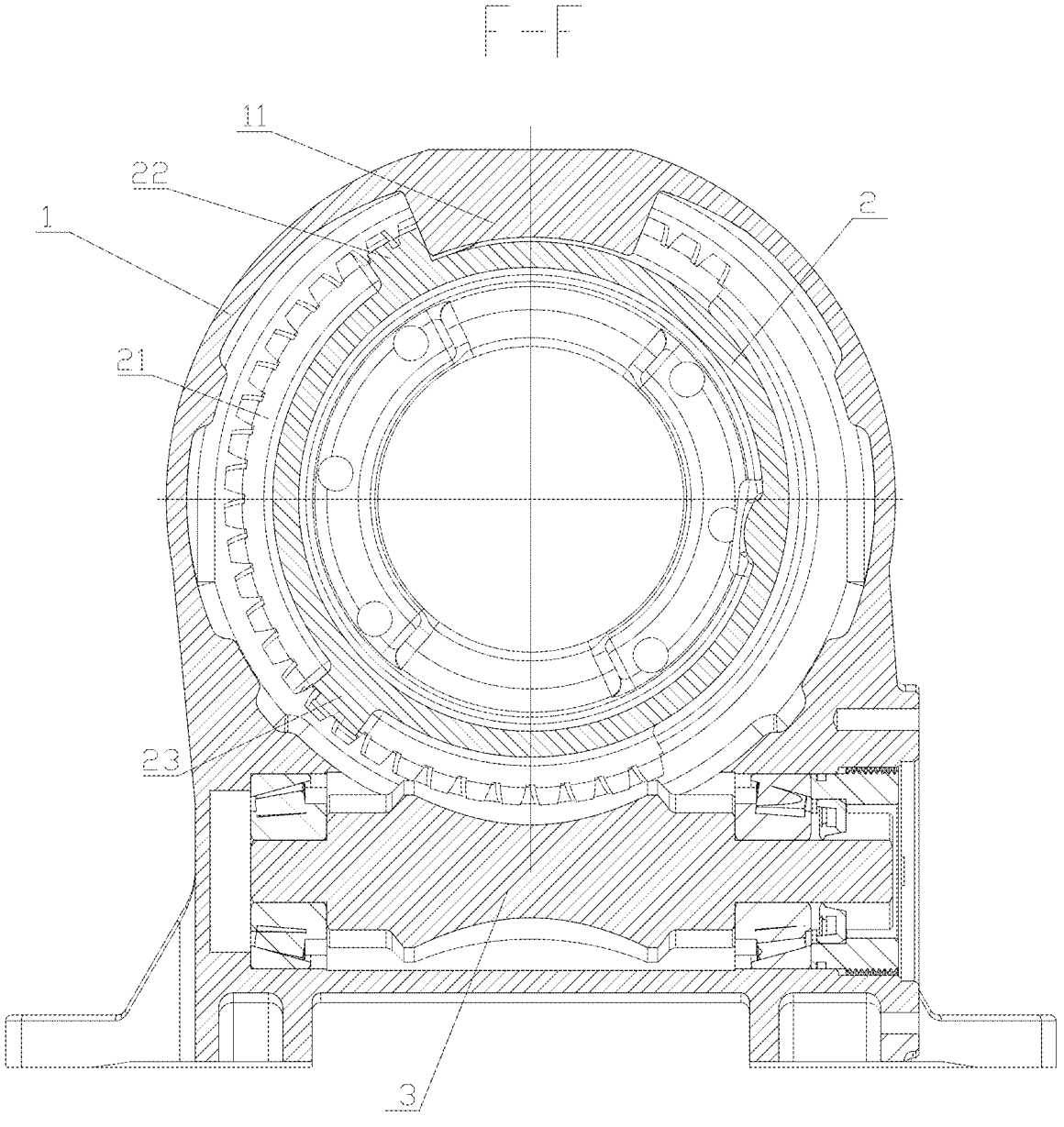
FIG. 12 is a schematic cross-sectional view of another hard limiting state of a reduction gearbox for solar photovoltaic tracking along a line F-F according to Embodiment 2 of this application.
Figure 13:
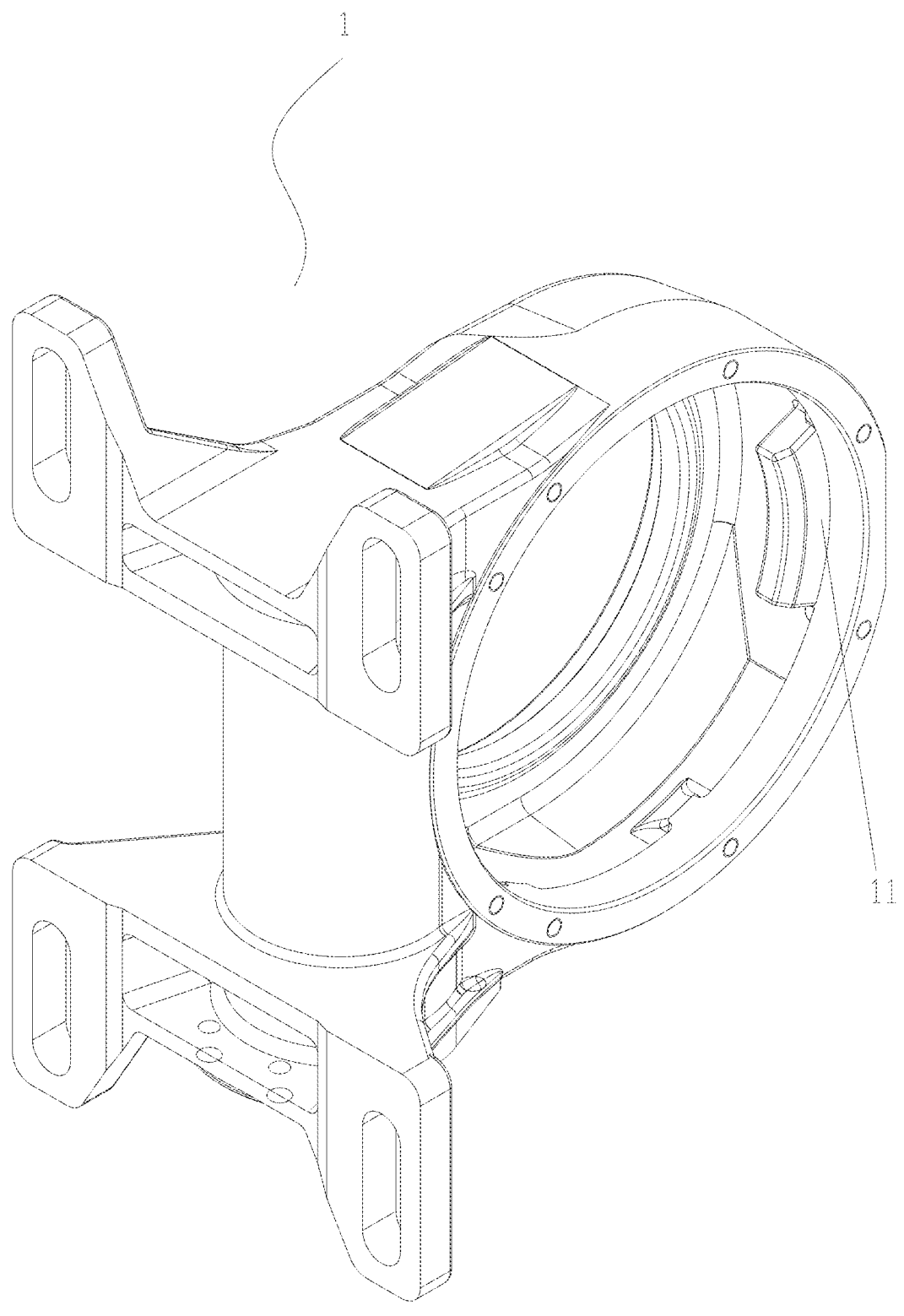
FIG. 13 is a three-dimensional schematic diagram of a housing of a reduction gearbox for solar photovoltaic tracking according to Embodiment 2 of this application.
Figure 14:
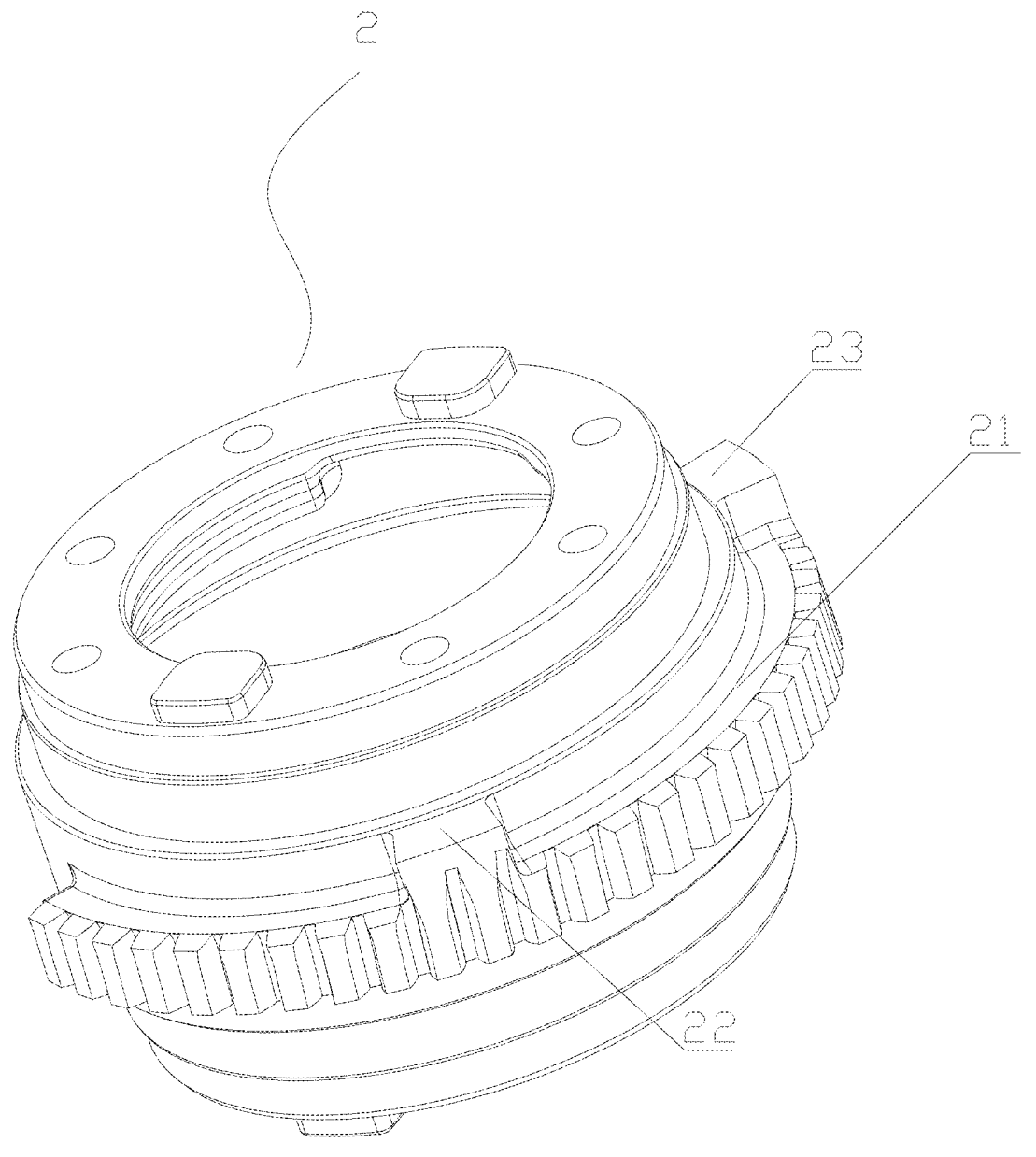
FIG. 14 is a three-dimensional schematic diagram of a gear of a reduction gearbox for solar photovoltaic tracking according to Embodiment 2 of this application.

In this preferred embodiment, FIG. 10 to FIG. 12 show another reduction gearbox for solar photovoltaic tracking, including a housing 1, a gear 2, a worm 3, and an end cover 4. A mounting cavity of the gear 2 and a mounting cavity of the worm 3 are disposed in the housing 1. A gear ring 21 of the gear 2 is meshed with the worm 3. The end cover 4 is fastened to the housing 1 by using a plurality of bolts to limit an axial motion range of the gear 2. The housing 1 is shown in FIG. 13, and a limiting stopper 11 is disposed on one side that is of the top of the housing 1 and that is close to the end cover 4. The gear 2 is shown in FIG. 14, and a first limiting protrusion 22 and a second limiting protrusion 23 that are protruded are symmetrically disposed on one side that is of the gear ring 21 of the gear 2 and that is close to the end cover 4. The limiting stopper 11 constitutes a hard limiting structure of the reduction gearbox together with the first limiting protrusion 22 and the second limiting protrusion 23.

Similarly, a sum of an included angle between an outer end surface of the first limiting protrusion 22 and an outer end surface of the second limiting protrusion 23 and a central angle of the limiting stopper 11 is less than or equal to 170°. To be specific, as shown in FIG. 11, when the outer end surface of the first limiting protrusion 22 abuts against one end of the limiting stopper 11, an included angle between the outer end surface of the second limiting protrusion 23 and the other end of the limiting stopper 11 is greater than or equal to 190°; or as shown in FIG. 12, when the outer end surface of the second limiting protrusion 23 abuts against the other end of the limiting stopper 11, an included angle between the outer end surface of the first limiting protrusion 22 and one end of the limiting stopper 11 is greater than or equal to 190°. A difference between a central angle of the gear ring 21 of the gear 2 and a central angle of the worm 3 is greater than or equal to 180°. Herein, the central angle of the worm 3 is still defined with an axis of the gear 2 as a center, and is an included angle between two ends of a worm tooth of the worm 3 relative to the axis of the gear 2. When the photovoltaic panel is in a horizontal state, an intermediate portion of the gear ring 21 of the gear 2 is meshed with the worm 3 (not shown). In this case, an included angle between an end surface of a first end that is of the gear ring 21 and that is close to the first limiting protrusion 22 and an end surface that is of the worm tooth of the worm 3 and to which the end surface of the first end is close is greater than or equal to 90°, and an included angle between an end surface of a second end that is of the gear ring 21 and that is close to the second limiting protrusion 23 and an end surface that is of the worm tooth of the worm 3 and to which the end surface of the second end is close is also greater than or equal to 90°. Therefore, the photovoltaic panel can rotate to be perpendicular to the ground in such two hard limiting cases.

In some embodiments, an included angle between two end surfaces of the limiting stopper 11 is 30° to 50°. In the foregoing embodiment, the included angle between the two end surfaces of the limiting stopper 11 is 40°, and a center of the included angle between the two end surfaces is on the axis of the gear 2.

In the foregoing embodiment, a thickness of the limiting stopper 11 is the same as a thickness of the first limiting protrusion 22 and a thickness of the second limiting protrusion 23. The thickness of the limiting stopper 11 is less than a thickness of the gear ring 21.

In the foregoing embodiment, a central angle of a notch of the gear ring 21 of the gear 2 is greater than a central angle of the two end surfaces of the limiting stopper 11.

In the foregoing embodiment, the first limiting protrusion 22 and the second limiting protrusion 23 are integrated with the gear ring 21 of the gear 2, and the limiting stopper 11 is integrated with the housing 1. Certainly, in some slewing drives assembled with small photovoltaic panels, the first limiting protrusion 22, the second limiting protrusion 23, and the gear ring 21 of the gear 2 may be separate structures and fastened by using bolts or the like, and the limiting stopper 11 and the housing 1 may also be separate structures and fastened by using bolts or the like. However, in such a case, connection strength is insufficient, and the bolts are cut off or deformed and bent, resulting in collision between a photovoltaic module and a mount.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A reduction gearbox for solar photovoltaic tracking, comprising a housing, an end cover, a gear, and a worm, wherein a first limiting stopper is disposed on a top of the housing; a first pair of a first limiting protrusion and a second limiting protrusion are disposed on a first side of a gear ring of the gear; the first limiting stopper and the first pair of the first limiting protrusion and the second limiting protrusion disposed on the first side of the gear ring of the gear constitute a first hard limiting structure; an outer end surface of the first limiting protrusion and an outer end surface of the second limiting protrusion are far away from each other, and a sum $\theta 1 + \theta 2$ of an included angle $\theta 1$ between the outer end surface of the first limiting protrusion and the outer end surface of the second limiting protrusion and a central angle $\theta 2$ of the first limiting stopper is less than or equal to 170°, wherein the central angle $\theta 2$ of the first limiting stopper is defined with an axis of the gear as a center, and is an included angle between two ends of the first limiting stopper relative to the axis of the gear; and a difference $\theta 3 - \theta 4$ between a central angle $\theta 3$ of the gear ring of the gear and a central angle $\theta 4$ of the worm is greater than or equal to 180°, wherein the central angle $\theta 3$ of the gear ring of the gear is defined with the axis of the gear as the center, and is an included angle between two ends of the gear ring of the gear relative to the axis of the gear, and the central angle $\theta 4$ of the worm is defined with the axis of the gear as the center, and is an included angle between two ends of a worm tooth of the worm relative to the axis of the gear;

wherein a second pair of the first limiting protrusion and the second limiting protrusion are also disposed on a second side of the gear ring of the gear, and a second limiting stopper is disposed on the top of the housing; and the second limiting stopper and the second pair of the first limiting protrusion and the second limiting protrusion disposed on the second side of the gear ring of the gear constitute a second hard limiting structure.

2. A reduction gearbox for solar photovoltaic tracking, comprising a housing, an end cover, a gear, and a worm, wherein a first limiting stopper is disposed on a top of the housing; a first pair of a first limiting protrusion and a second limiting protrusion are disposed on a first side of a gear ring of the gear; the first limiting stopper and the first pair of the first limiting protrusion and the second limiting protrusion disposed on the first side of the gear ring of the gear constitute a first hard limiting structure; an outer end surface of the first limiting protrusion and an outer end surface of the second limiting protrusion are far away from each other, and a sum θ1+θ2 of an included angle θ1 between the outer end surface of the first limiting protrusion and the outer end surface of the second limiting protrusion and a central angle θ2 of the first limiting stopper is less than or equal to 170°, wherein the central angle θ2 of the first limiting stopper is defined with an axis of the gear as a center, and is an included angle between two ends of the first limiting stopper relative to the axis of the gear; and a difference θ3-θ4 between a central angle θ3 of the gear ring of the gear and a central angle θ4 of the worm is greater than or equal to 180°, wherein the central angle θ3 of the gear ring of the gear is defined with the axis of the gear as the center, and is an included angle between two ends of the gear ring of the gear relative to the axis of the gear, and the central angle θ4 of the worm is defined with the axis of the gear as the center, and is an included angle between two ends of a worm tooth of the worm relative to the axis of the gear;

wherein an included angle θ5 between two end surfaces of the first limiting stopper is 30° to 50°.

3. The reduction gearbox for the solar photovoltaic tracking according to claim 1, wherein an end portion of a second end of the gear ring is meshed with the worm when the outer end surface of the first limiting protrusion abuts against a first end of the first limiting stopper, wherein the second end of the gear ring is adjacent to the second limiting protrusion; and an end portion of a first end of the gear ring is meshed with the worm when the outer end surface of the second limiting protrusion abuts against a second end of the first limiting stopper, wherein the first end of the gear ring is adjacent to the first limiting protrusion.

4. A reduction gearbox for solar photovoltaic tracking, comprising a housing, an end cover, a gear, and a worm, wherein a first limiting stopper is disposed on a top of the housing; a first pair of a first limiting protrusion and a second limiting protrusion are disposed on a first side of a gear ring of the gear; the first limiting stopper and the first pair of the first limiting protrusion and the second limiting protrusion disposed on the first side of the gear ring of the gear constitute a first hard limiting structure; an outer end surface of the first limiting protrusion and an outer end surface of the second limiting protrusion are far away from each other, and a sum θ1+θ2 of an included angle θ1 between the outer end surface of the first limiting protrusion and the outer end surface of the second limiting protrusion and a central angle θ2 of the first limiting stopper is less than or equal to 170°, wherein the central angle θ2 of the first limiting stopper is defined with an axis of the gear as a center, and is an included angle between two ends of the first limiting stopper relative to the axis of the gear; and a difference θ3-θ4 between a central angle θ3 of the gear ring of the gear and a central angle θ4 of the worm is greater than or equal to 180°, wherein the central angle θ3 of the gear ring of the gear is defined with the axis of the gear as the center, and is an included angle between two ends of the gear ring of the gear relative to the axis of the gear, and the central angle θ4 of the worm is defined with the axis of the gear as the center, and is an included angle between two ends of a worm tooth of the worm relative to the axis of the gear;

an end portion of a second end of the gear ring is meshed with the worm when the outer end surface of the first limiting protrusion abuts against a first end of the first limiting stopper, wherein the second end of the gear ring is adjacent to the second limiting protrusion; and an end portion of a first end of the gear ring is meshed with the worm when the outer end surface of the second limiting protrusion abuts against a second end of the first limiting stopper, wherein the first end of the gear ring is adjacent to the first limiting protrusion, and an included angle θ6 between an end surface of the first end of the gear ring and the outer end surface of the first limiting protrusion is 65°; and an included angle θ7 between an end surface of the second end of the gear ring and the outer end surface of the second limiting protrusion is also 65°.

5. The reduction gearbox for the solar photovoltaic tracking according to claim 1, wherein an included angle θ5 between two end surfaces of the first limiting stopper is 30° to 50°, and an included angle θ8 between two end surfaces of the second limiting stopper is 30° to 50°.

6. The reduction gearbox for the solar photovoltaic tracking according to claim 1, wherein an end portion of a second end of the gear ring is meshed with the worm when the outer end surface of the first limiting protrusion abuts against a first end of each of the first limiting stopper and the second limiting stopper, wherein the second end of the gear ring is adjacent to the second limiting protrusion; and an end portion of a first end of the gear ring is meshed with the worm when the outer end surface of the second limiting protrusion abuts against a second end of each of the first limiting stopper and the second limiting stopper, wherein the first end of the gear ring is adjacent to the first limiting protrusion.

* * * * *